(12) United States Patent
Hu et al.

(10) Patent No.: US 6,891,979 B2
(45) Date of Patent: May 10, 2005

(54) POCKET SCANNERS

(75) Inventors: Darwin Hu, San Jose, CA (US); Alpha Hou, San Jose, CA (US); Jung-Chih Huang, Fremont, CA (US); Paul Tin Choy Cheung, Fremont, CA (US); Hongwei Sun, GuangDong (CN); Yingfeng Lv, GuangDong (CN)

(73) Assignees: Syscan, Inc., San Jose, CA (US); Shenzhen Syscan Technology Co., Ltd. (CN)

( * ) Notice: Subject to any disclaimer, the term of this patent is extended or adjusted under 35 U.S.C. 154(b) by 538 days.

(21) Appl. No.: 09/963,094

(22) Filed: Sep. 24, 2001

(65) Prior Publication Data

US 2002/0131637 A1 Sep. 19, 2002

Related U.S. Application Data

(63) Continuation-in-part of application No. 09/812,705, filed on Mar. 19, 2001.

(51) Int. Cl.⁷ .............................................. G06K 9/22
(52) U.S. Cl. ..................... 382/313; 250/228; 250/234; 250/236; 250/574; 358/296; 358/473; 358/474; 382/181; 382/317; 382/318; 382/321
(58) Field of Search ................................ 382/181, 318, 382/321, 115, 313, 317; 250/228, 234, 236, 574; 358/296, 412, 472, 473, 474, 475, 482, 487, 494, 497

(56) References Cited

U.S. PATENT DOCUMENTS

| | | | | |
|---|---|---|---|---|
| 5,049,999 | A | * 9/1991 | Stemmle | 358/296 |
| 5,381,487 | A | * 1/1995 | Shamos | 382/115 |
| 5,490,283 | A | * 2/1996 | Chin | 710/73 |
| 5,764,493 | A | * 6/1998 | Liao | 362/31 |
| 5,801,849 | A | * 9/1998 | Soloveychik et al. | 358/474 |
| 5,841,553 | A | * 11/1998 | Neukermans | 358/494 |
| 5,842,027 | A | * 11/1998 | Oprescu et al. | 713/300 |
| 5,883,820 | A | * 3/1999 | Ota et al. | 1/1 |
| 6,007,195 | A | * 12/1999 | Kokubo | 347/108 |
| RE36,503 | E | * 1/2000 | Rubley et al. | 250/208.1 |
| 6,054,707 | A | * 4/2000 | Hou | 250/234 |
| 6,064,779 | A | * 5/2000 | Neukermans et al. | 382/313 |
| 6,115,241 | A | * 9/2000 | Hu | 361/683 |
| 6,163,385 | A | * 12/2000 | Kajander | 358/475 |
| 6,229,139 | B1 | * 5/2001 | Neukermans et al. | 250/236 |
| 6,459,506 | B1 | * 10/2002 | Hu et al. | 358/473 |
| 6,788,437 | B1 | * 9/2004 | Boyd | 358/475 |

\* cited by examiner

*Primary Examiner*—Bhavesh M. Mehta
*Assistant Examiner*—Gregory Desire
(74) *Attorney, Agent, or Firm*—Joe Zheng

(57) ABSTRACT

A method and system is disclosed for facilitating the input of information into a computing device by a scanning means. A pocket scanner that has only the minimum components/parts therein and will not operate without being connected to the computing device that subsequently receives scanning signals therefrom. In particular, the disclosed scanner does not have a separate power supply to energize the components/parts to work.

18 Claims, 9 Drawing Sheets

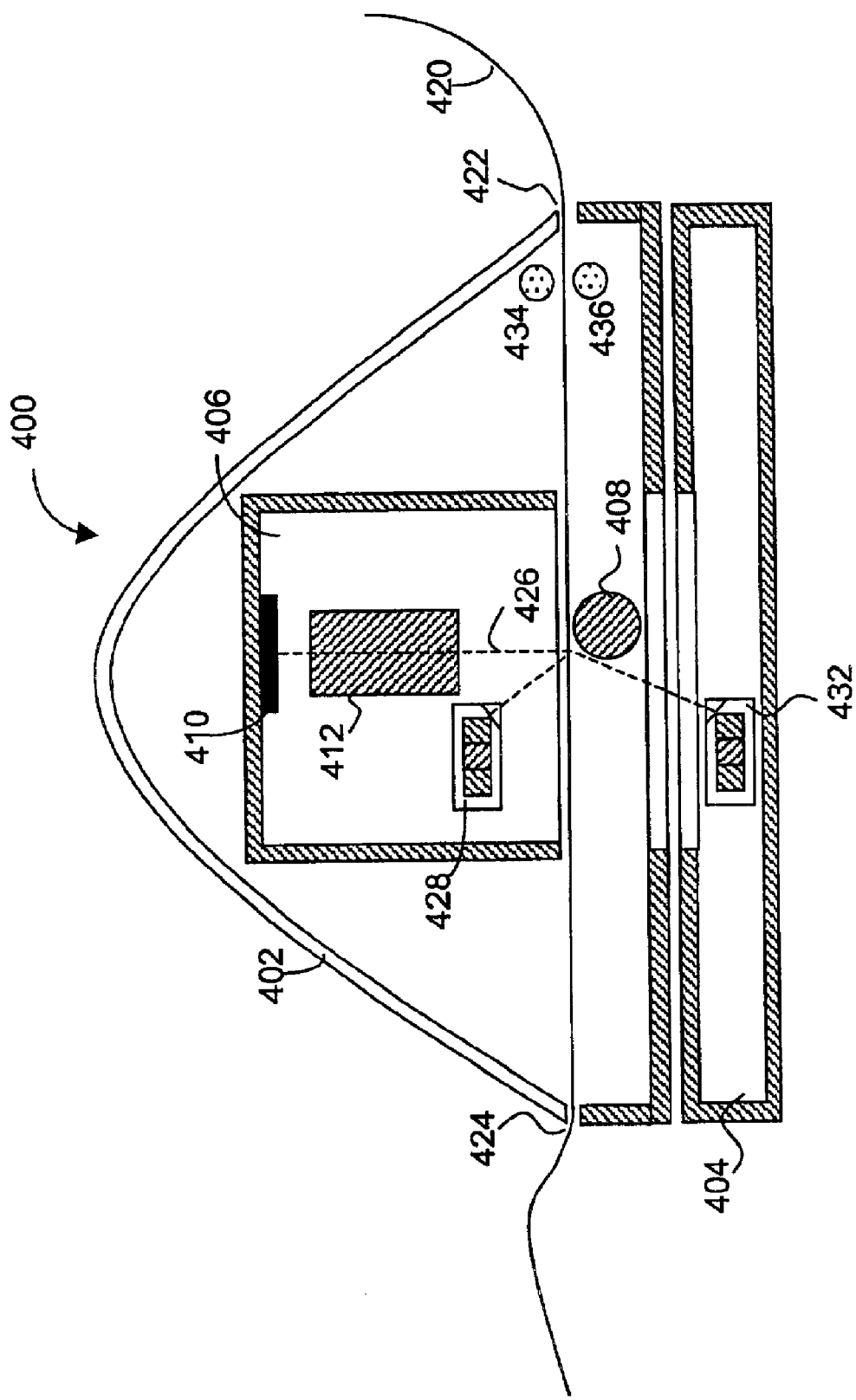

POCKET SCANNERS

CROSS-REFERENCE TO RELATED APPLICATION

This is a continuation-in-part of co-pending U.S. application Ser. No. 09/812,705, entitled "Palm Office Assistants", filed Mar. 19, 2001, and related to U.S. Pat. No. 6,275,309, entitled "Lightweight mobile scanners", which is incorporated by reference.

BACKGROUND OF THE INVENTION

1. Field of the Invention

The present invention generally relates to a scanning system and more particularly relates to a pocket scanner connectable to a mobile computing device, wherein the pocket scanner is not energized by a separate power supply, the power required to support the pocket scanner is derived from an interface to the mobile computing device.

2. Description of the Related Art

Personal Data Interchange (PDI) occurs every time two or more individuals communicate, in either a business or personal context. Such interchanges frequently include the exchange of information containing alphanumeric characters and symbols, such as business cards, purchase receipts, tickets, contracts, and other types of documents. To manage the amount of information gathered via PDI, many individuals use portable hand-held computing devices such as hand-held computers, personal digital assistants, smart phones and WAP enabled phones with limited user interfaces, limited power resources and limited computing and memory resources.

Capturing the data into a portable computing device with limited user interfaces has always been a challenge. One of the popular portable computing devices (e.g. a palm hand-held from Palm, Inc.) provides a writing pad from which a user can write in texts letter by letter. Typically, it takes minutes to input relevant information from a business card into such device. Although such input is tedious and laborious, a portable computing device provides more conveniences that have outweighed the awkward input mechanism.

Many business cards have a symbolic emblem or a graphic logo beside a name, a title, one or more phone numbers, an e-mail address. One of the purposes for such graphic logo on a business card is to leave a recipient of the business card a strong impression of the business entity/relevant services/products implied in the business card. The above text-based input, however, would discard the graphic logo, which is certainly not desirable by a business entity in a business card.

There is therefore a need for a portable device that facilitates an easy input mechanism so that a user can read in text information as well as graphic information.

SUMMARY OF THE INVENTION

The present invention has been made in consideration of the above described problems and needs. The disclosed invention provides a mobile scanner that has only the minimum components/parts therein and will not operate without being connected to a computing device. In return, the computing device receives scanning signals therefrom for display, OCR, archival or transmission to another device, to name a few. In particular, the disclosed scanner does not have a separate power supply to energize the components/parts to work. In one embodiment, there is not a single microcontroller in the disclosed scanner while the performance thereof could outperform those scanners commanded traditionally by a microcontroller enclosed in the scanners. The benefits and advantages of the disclosed scanner includes high performance but low cost and is so adaptive or configured that it can be coupled to or integrated with any computing device supporting a peripheral device.

Accordingly, one of the objects in the present invention is to provide a pocket scanner to users who use a computing device. As a result, the computing device is capable of scanning in various scanning objects to facilitate the input of a large amount of information with great ease.

Other objects, together with the foregoing are attained in the exercise of the invention in the following description and resulting in the embodiment illustrated in the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 3 shows a cross-section view of a mobile scanner that may correspond to the one shown in FIG. 2;

DETAILED DESCRIPTION OF THE INVENTION

The invention pertains to a method and system for facilitating the input of a large amount of information to a computing device by using a scanner that is designed small in size and light in weight. The computing device, preferably, a portable device can thus be equipped with methods and systems for capturing, processing, storing and augmenting alphanumeric characters, symbolic data, graphic and biometric representations resident on a scanning object (e.g. a business card, a sheet of paper). A portable device may include, but not be limited to, a palm sized computing device, a personal digital assistant, a smart phone and a data network enabled cell phone. According to one aspect of the present invention, a linear scanner is integrated with a portable device and serves as an input mechanism for the portable device to scan in texts, alphanumeric characters, symbolic data, graphic or biometric representations. Specifically, contents resident on documents (i.e. scanning documents) are scanned in or captured, possibly, classified and processed using type-specific software modules resident on the subject portable device or on accessible remote server devices. One of the advantages and benefits provided in the present invention is to provide a solution for a portable or palm office assistant to be equipped with some of the basic office utilities.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices. These process descriptions and representations are the means used by those experienced or skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
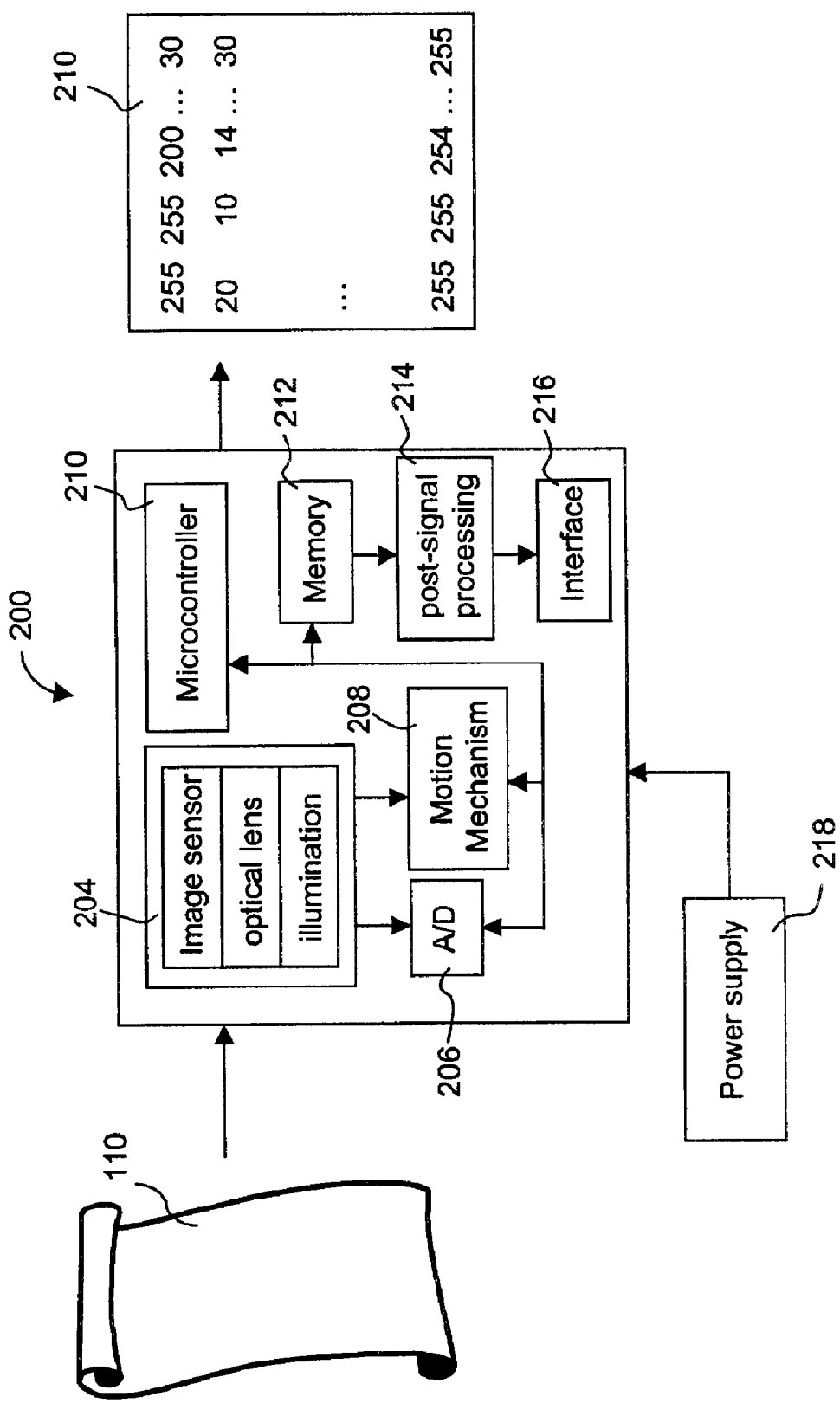
FIG. 1 shows a systemic diagram of a prior art scanner that converts a paper-based scanning object to a corresponding digital image.

Referring now to the drawings, in which like numerals refer to like parts throughout the several views. FIG. 1 shows a systemic diagram of a prior art scanner 200 that converts a paper-based scanning object 110 to a corresponding digital image 202. Scanner 200 comprises an image sensing module 204, analog-to-digital circuitry 206, motion mechanism 208, a microcontroller 210 and memory 212. Motion mechanism 208 controlled by microcontroller 210 works in synchronization with image sensing module 204 to move or advance scanning object 110 such that image sensing module 204 images scanning object 110 while scanning object 110 is passing through image sensing module 204 at a steady speed.

Image signals from image sensing module 204 are then digitized by analog-to-digital circuitry 206 to produce digital signals (raw data) representing scanning object 110. To have a common interface with most of the computing devices, scanner 200 further comprises post-signal processing circuitry 214 and an interface 216. Post-signal processing circuitry 214 generally performs digital signals enhancement and often presents the digital signals in a standard image format, such as TIFF or BMP. Interface 216 prepares the images for real-time transmissions through a standard interface, such as IEEE RS-232, via a serial port to a computing device. In addition, power supply 218, typically heavy and bulky, is provided to scanner 200 to energize all the parts in scanner 200 to operate.

Figure 2:
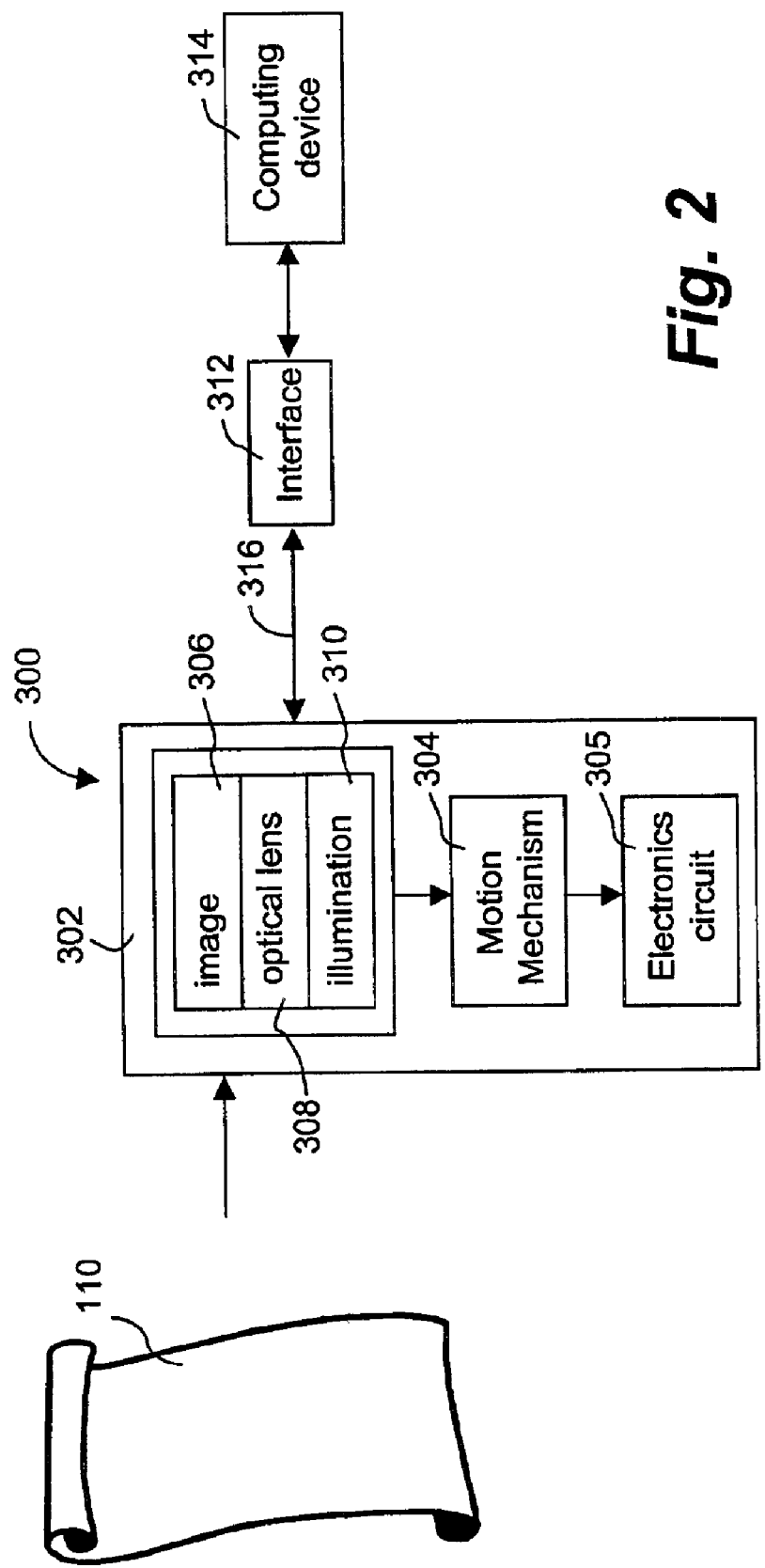
FIG. 2 shows a block diagram of a pocket scanner according to one embodiment of the present invention.

Referring now to FIG. 2, there is shown a block diagram of a mobile scanner 300 according to one embodiment of the present invention. Mobile scanner 300 is designed to scan a scanning object of small size, such as a business card, and accordingly referred interchangeably to as a pocket scanner so that a user can simply carry such scanner around in a briefcase or a pocket. Depending on an exact implementation, mobile scanner 300 can comprise fewer parts than in scanner 200 of FIG. 1. In generally, there are three collective parts in mobile scanner 300; an image sensing module 302, motion mechanism 304 and electronics circuit 305. It should be noted that there is no separate power supply to energize image sensing module 302, motion mechanism 304 and electronics circuit 305 to operate. Scanner 300 operates only when it is connected to computing device 314 via an interface 312. The power to energize the scanner is provided from the interface 312 that in turn takes from computing device 314. The elimination of a separate power will considerably reduce the overall weight and size of a scanner and make the use of the scanner more efficiently.

Image sensing module 302 comprises an image sensor 306, an optical lens 308 and an illumination system 310. In one embodiment, image sensor 306 is an array of Complementary Metal-Oxide Semiconductor (CMOS) photodetectors, each producing a charge signal when being exposed to incident light reflected from a scanning object. Generally, the number of photodetectors in the array depends on the maximum size of a scanning document the scanner is designed to accommodate and the resultant image resolution. For example, a business card has a size of 2 by 3 inches. For 300 dpi (dot per inch) resolution, the number of photodetectors can be 2×300=600.

Optical lens 308 collects incident light from a scanning object illuminated by illumination source 304 onto image sensor 306, thereby an image of the scanning object is produced. Motion mechanism 304, known in all scanners, is responsible for moving the scanning object through image sensor 306 so that the entire scanning object can be scanned. The scanning signals are preferably processed in electronics circuit 305. Depending on different implementations, electronics circuit 305 may include one or more of an A/D circuit, memory and a post-processing circuit. According to one embodiment, electronics circuit 305 does not include a controller or processor to synchronize the operations of all parts in scanner 300. The operations of all parts are synchronized or controlled by the processor in computing device 314. Given the description herein, those skilled will understand the design of a special circuit operating on one or more control signals received from computing device 314 and the special circuit can be included in electronics circuit 305.

According to one embodiment of the present invention, image sensing module 302, motion mechanism 304 and electronics circuit 305 are housed in a compact case that can be made of a kind of light but rigid plastic material. FIG. 3 shows a cross-section view of an example pocket scanner 400 according to the present invention. As shown in the figure, scanner 400, appearing rounded triangle shaped, comprises a main case 402 that houses an image sensing module 406 and motion mechanism of which only a rubber surfaced rod 408 is shown. A scanning object 420 is received from receiving opening 422, then moved by moving rod 408 to pass an optical path 426 and exited from exiting opening 424. When scanning object 420 passes optical path 426, scanning object 420 is illuminated by front illumination source 428, reflected light from scanning object 420 is collected by lens 412 and focused upon image sensor 410. It is noticed that illumination source 428 is referred to as front illumination source because it provides front illumination to a scanning object that is opaque. In other words, when scanning object 420 is transparent, no reflected light can be collected from the scanning object illuminated by illumination source 428.

Optionally, scanner 400 includes a base case 404 that comprises a second illumination source 432 which provides back illumination and can be removably mounted to main case 402 when there is a need to scan a scanning object that is transparent. The transparent sheet-like scanning object may include negative or positive films, transparencies for an overhead projector or X-ray films.

Figure 4A:
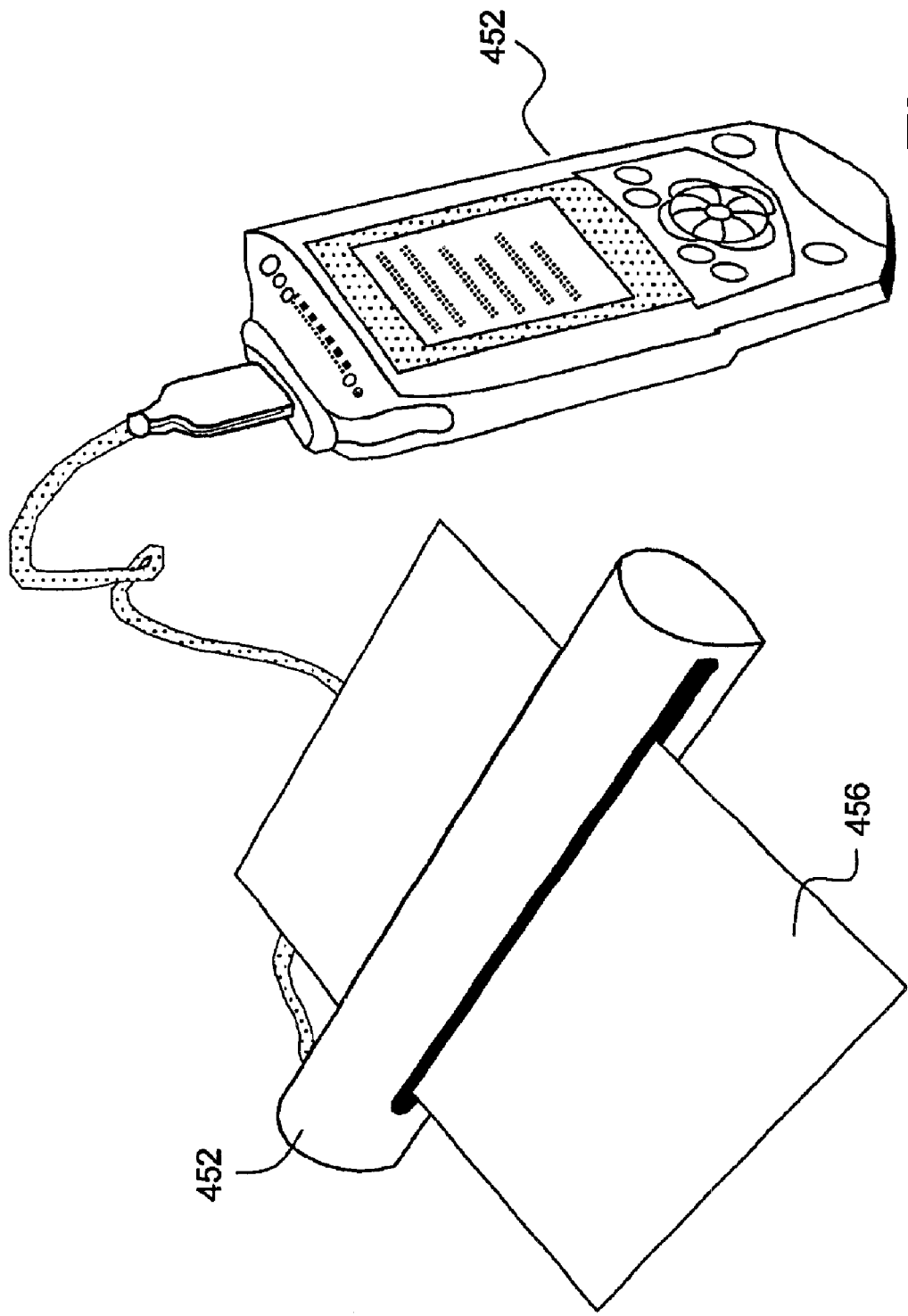
FIGS. 4A–4C show, respectively, three exemplary uses of a scanner disclosed herein to work with a (portable) computing device.

FIG. 4A shows an example in which a scanner 450 is connected to a portable computer 452 through a cable connection means 454. Portable computer 452 includes a corresponding connector means for being coupled with cable connection means 454. In particular, two pins in the connector means provide a DC power supply and scanner 450 is thus energized when connected to the connector means of the portable computer 452. In one case, the connector or the cable connection means is a type of universal serial bus (USB) and thus cable connection means 454 is a USB cable. As a user inserts a scanning object 456 which may be a sheet of paper, the motion mechanism causes scanning object 456 to advance forward and at the same time, scanning signals or data reflecting the scanning object are generated and transported to portable computer 452 through cable connection means 454. Once arriving in portable computer 452, the scanning data is processed in portable computer 452 for various purposes that may include, but not be limited to, display, optical character recognition and archival.

In another embodiment, a software application or agent is executed in portable computer 452 that generates control signals for scanner 450 to operate. Typically, this requires a connector having more pins than a USB, for example, a RS232 serial port. Those skilled in the art can understand how such software application or agent can be designed to cause portable computer 452 to produce desired signals. As a result, the electronics circuit in the scanner can be significantly simplified as many control signals could be provided from portable computer 452 rather than generated in the electronics circuit in the scanner.

Figure 4B:
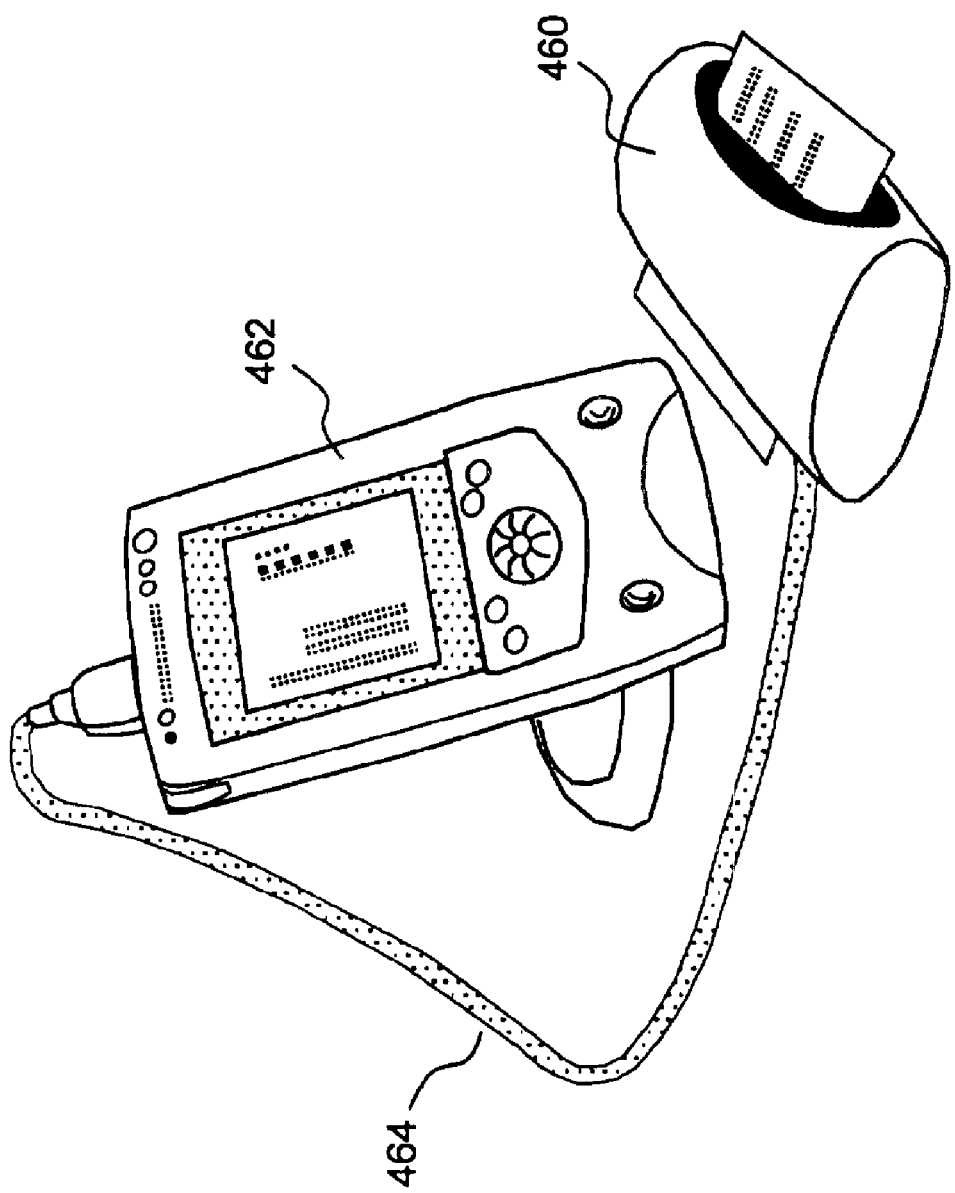

FIG. 4B shows that a scanner or business scanner 460 configured to scan a business card is coupled to a palm-sized computing device 462 (e.g. a Palm Pilot) through a connection cable 464. Depending on an exact implementation, connection cable 464 can be any suitable type to bring power and/or control signals from computing device 462 to energize and operate scanner 460 and, at the same time, scanning signals generated in scanner 460 are transported to computing device 462.

Figure 4C:
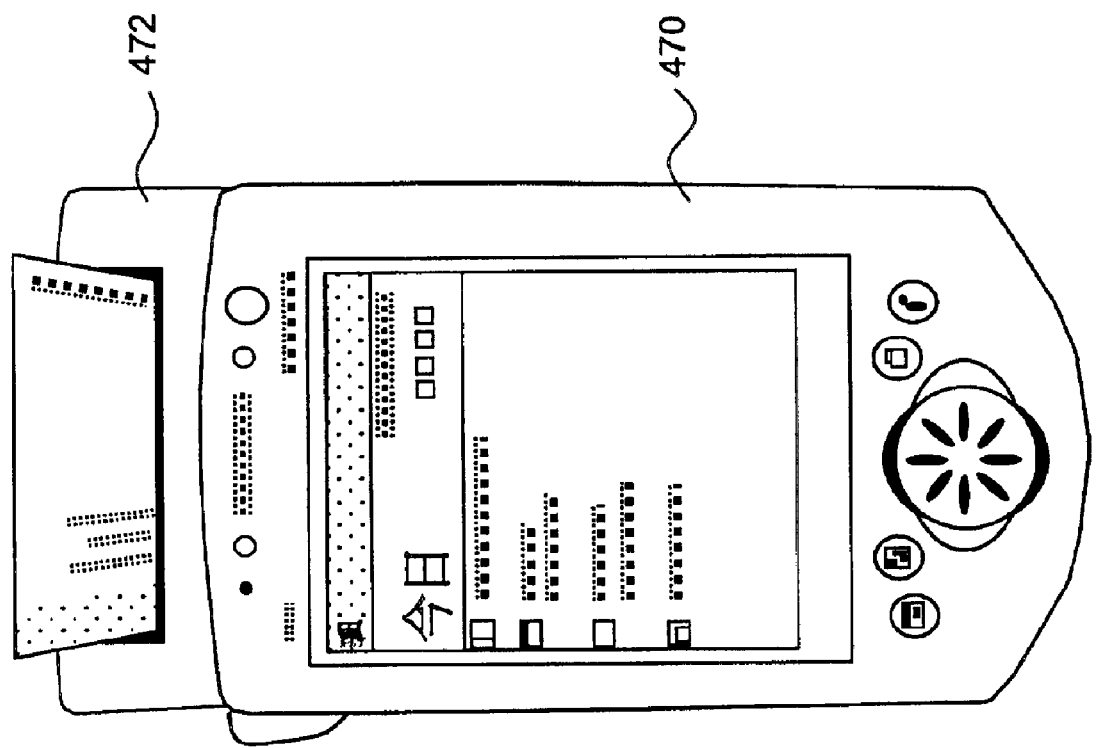

FIG. 4C illustrates that a pocket scanner 470 is so designed and configured that it can be integrated with a palm-sized computing device 472. As a result, computing device 472 is equipped with a convenient input mechanism and can record, input and enter various information by scanning a scanning object through the integrated pocket scanner 470.

Figure 5:
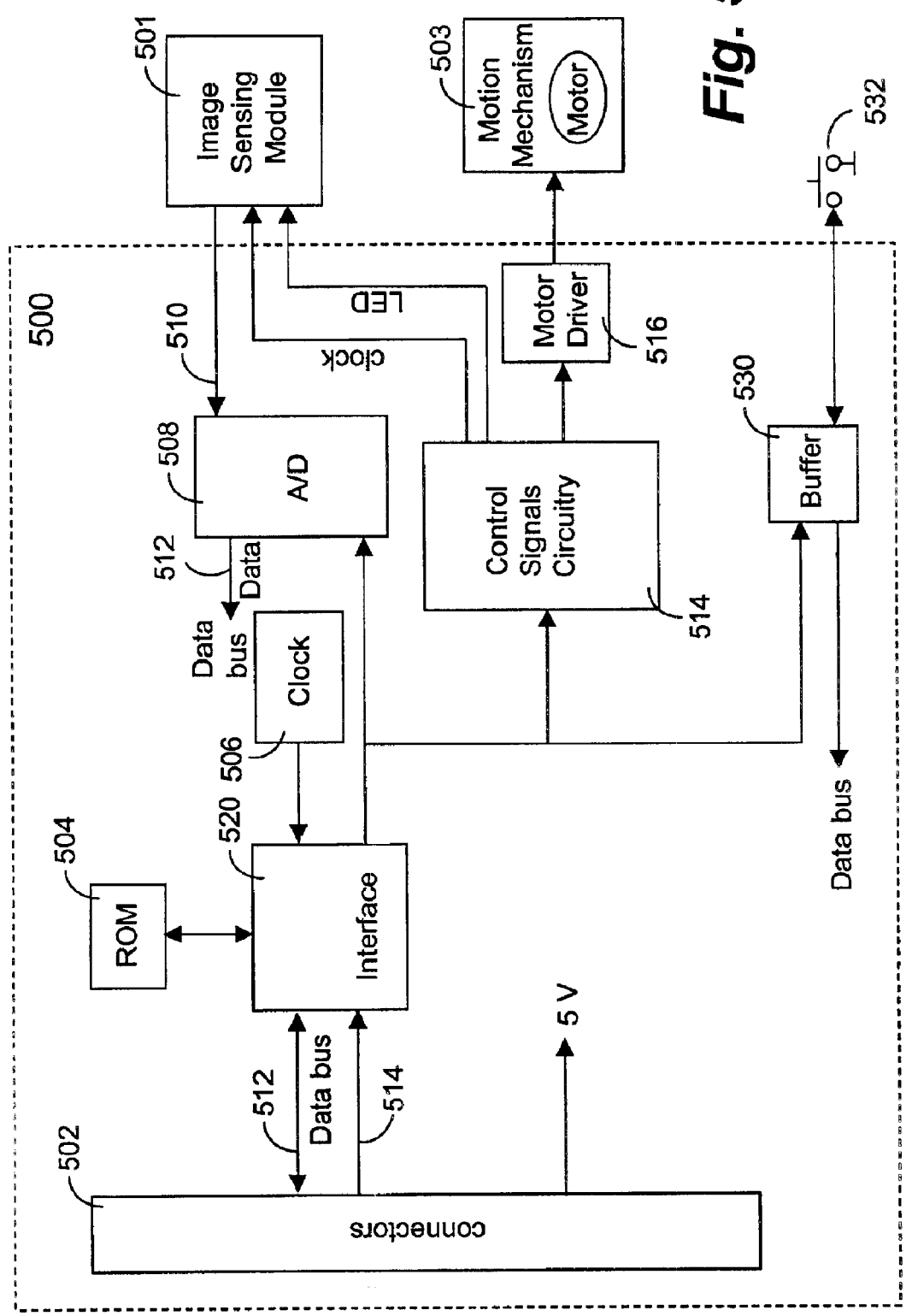
FIG. 5 shows an internal block diagram of an electronics circuit that may be used in present invention to support the scanner.

Referring now to FIG. 5, there is shown an internal block diagram of exemplary electronic circuit 500 that may be used to control the operations of image sensing module 501 and motion mechanism 503. Electronic circuit 500 itself is powered by the power from a computing device having a connector or connectors coupled to connectors 502 of electronic circuit 500. Typically two pins in connectors 502 draws the power (e.g. 5-volt) from the computing device. The 5-volt power is further provided to image sensing module 501 and motion mechanism 503 to function accordingly.

Read Only Memory (ROM) 504 provides information to the computing device what functions or procedures electronic circuit 500 performs and what system resources (I/O, IRQ, etc) it requires. Clock 506, typically an oscillator circuit, provides a central clocking signal to all the parts in electronic circuit 500 to work in synchronization.

According to one embodiment, image sensing module 501 outputs analog signals generated from the charge signals in the photodetectors of the image sensor when image sensor is impinged with incident light (reflected or transmitted light). The analog signals are received by an analog-to-digital (A/D) converter 508 through an analog signal line 510 and the resultant digitized (digital) signals are uploaded to the computing device via data bus 512. The illumination source in the image sensing module 501 is controlled and synchronized by control signals from control signals circuitry 514 that operates under system control signals from the computing device via connectors 502. Typically, the illumination source comprises three primary colored lights, such as red, green and blue. To reproduce a color image, three primary color intensity images must be obtained. In other words, A/D converter 508 receives three analog signals respectively for each of the colored lights and produces respectively three digital signals.

The control signals from control signals circuitry 514 ensures that only one of the three lights is "ON" at one time for a specific period and each of the lights is successively turned on. Similarly, to ensure that motion mechanism 501 to operate in synchronization with image sensing module 503, motor drive 516 receives control signals from control signals circuitry 514. It is understood to those skilled in the art that control signals circuitry 514 is controlled by system control signals 514 generated from the computing device via connector 502 and comprises many logic circuits so as to generate control signals with different timings. As understood from the description herein, the system control signals are generated in the computing device that operates an application program, the application program implementing a process that uses the computing device to ultimately controls the operation of the scanner. Upon receiving the system control signals, connector interface 520, which typically an ASIC circuit, produces interface control signals to synchronize all parts in the interface engine. With respect to the interface control signals, control signals circuitry 514 generates a set of scanner control signals.

Each of the scanner control signals is used to synchronize the operation of a particular part. For example, three illumination control signals are generated to control the operation of the illumination source comprising the three colored lights. The timing in the illumination control signals is so designed that only one of the lights is turned on for a specific period at one time and the three lights are successively turned on. Similarly sensor control signals and motor control signals are generated with respect to the illumination control signals so that the image sensing module and the motion mechanism can work harmoniously to produce images of scanning objects.

Optionally, there is one protection control signal from control signals circuitry 514 to motor driver 516. The protection control signal is used to protect a motor in motion mechanism 503. For example, in the middle of scanning a document, one of the parts in the interface engine 500 malfunctions, the protection control signal can immediately cause motor drive 516 to stop the operation of the motor in motion mechanism 503.

Buffer 530 communicating with connectors 502 also receives interface control signals from decoder and register 520. Buffer 530 is primarily used to operate a switch means 532 for the computing device to operate accordingly. For example, switch means 532 is a control circuit for the pair of light source (emitter) 434 and photodetector 436 of FIG. 3, optionally switch means 532 is a manual button which upon being pressed, the scanner starts the scanning process, or further switch means 532 can control alternatively the front illumination and back illumination. Those skilled in the art can appreciate the utilities of switch means 532 and understand the detailed implementation according to the need.

Figure 6:
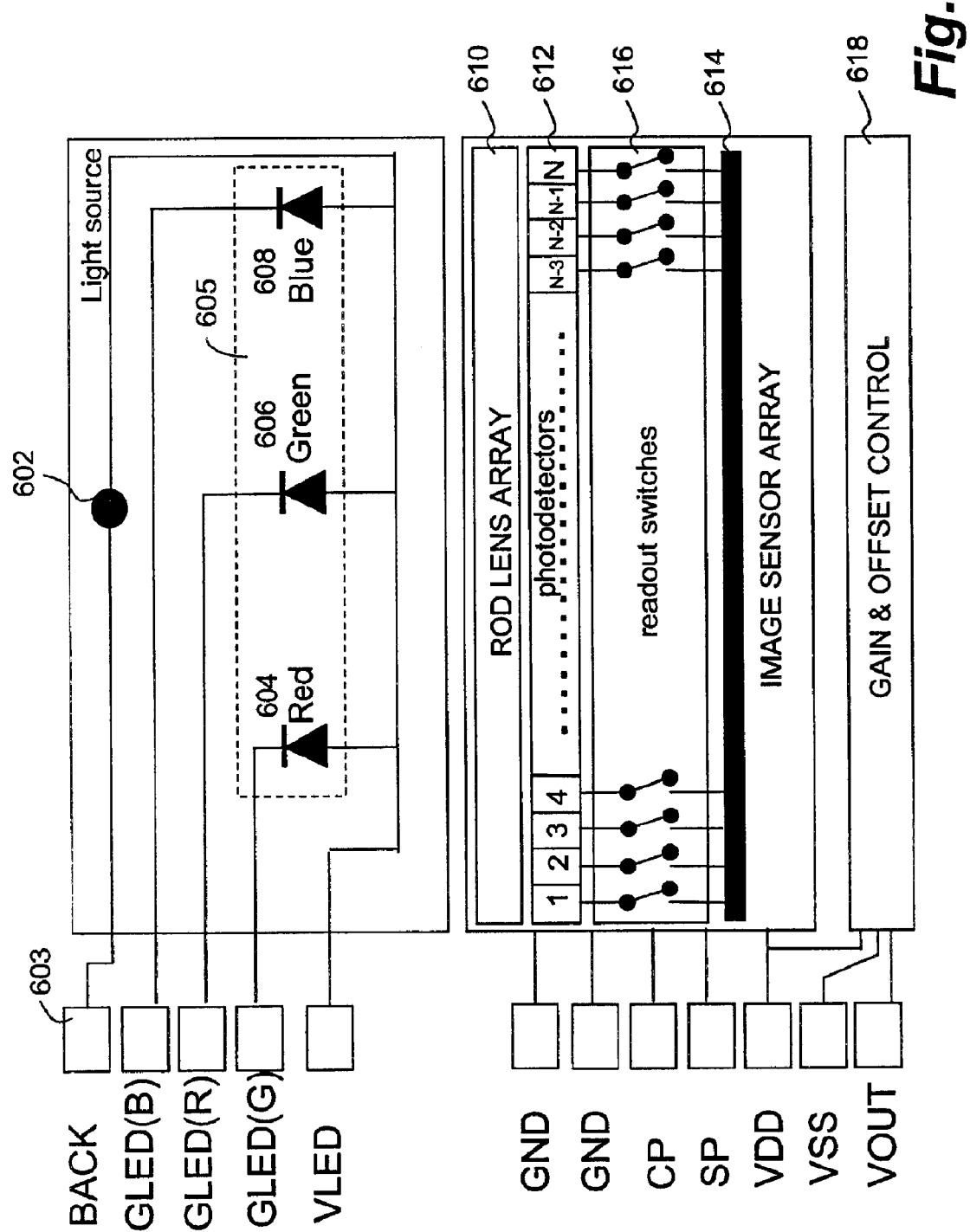
FIG. 6 illustrates an internal functional diagram of an image sensing module in one embodiment of the present invention.

To further understand the principles of the present invention, FIG. 6 shows an internal functional diagram of a sensing module according to one embodiment of the present invention. As illustrated, there are two illumination sources, first one 602 is for back illumination and second one 605 is for front illumination. The front illumination source comprises a red LED 604, a green LED 606 and a blue LED 608, each controlled respectively by a control signal, GLED, RLED or BLED at respective connectors 402, 404, and 406. The LED control signals GLED, RLED or BLED are provided from electronics circuit 500 of FIG. 5.

For simplicity, back illumination source 602 is shown one light and one connector 603. Those skilled in the art understand that back illumination source 602 may be implemented with a single LED or a fluorescent light controlled by an "ON" signal at connector 603, and alternatively with three colored lights similar to red LED 604, green LED 606 and blue LED 608, in which case connector 603 should be implemented with three separate connectors, and the corresponding control signals may be provided from electronics circuit 500 of FIG. 5. As described above, either illumination source 602 is turned "ON" for a transparent scanning object or the LEDs are successively turned "ON" for an opaque scanning object.

The rod lens array 610 collects either the reflected light from the opaque scanning object illuminated by one of red LED 604, green LED 606 and blue LED 608 or transmitted light from the transparent scanning object illuminated by back illumination source 602 and focuses the light onto image sensor 612. Image sensor 612 comprises, for example, N photodetectors. Each of the photodetectors collects light cast thereon during each integration process and generates a pixel signal. Upon the completion of the integration process, the pixel signals, each respectively generated by one of the photodetectors, are sequentially readout to the video bus 614 as a scanning signal via readout switch array 616 controlled by control signals from electronics circuit 500 of FIG. 5. It should be noted that image sensor 612 is assumed a CMOS type sensor and those skilled in the art will understand that the description works the same for CCD type sensors.

Switch array 616 comprises the same number of the readout switches as the number of the photodetectors in the image array 120. It is understood to those skilled in the art that each of the readout switches may be implemented by a diode that becomes "On" or "passing through" when a proper voltage from electronics circuit 500 of FIG. 5 is applied across. As shown in the figure, the scanning signal is coupled to a gain & offset control circuit 618. The scanning signal is processed, including amplified and offset, in gain & offset control circuit 618 with respect to a desired adjustment and subsequently output as a signal $V_{Out}$ to electronics circuit 500 of FIG. 5.

Figure 7:
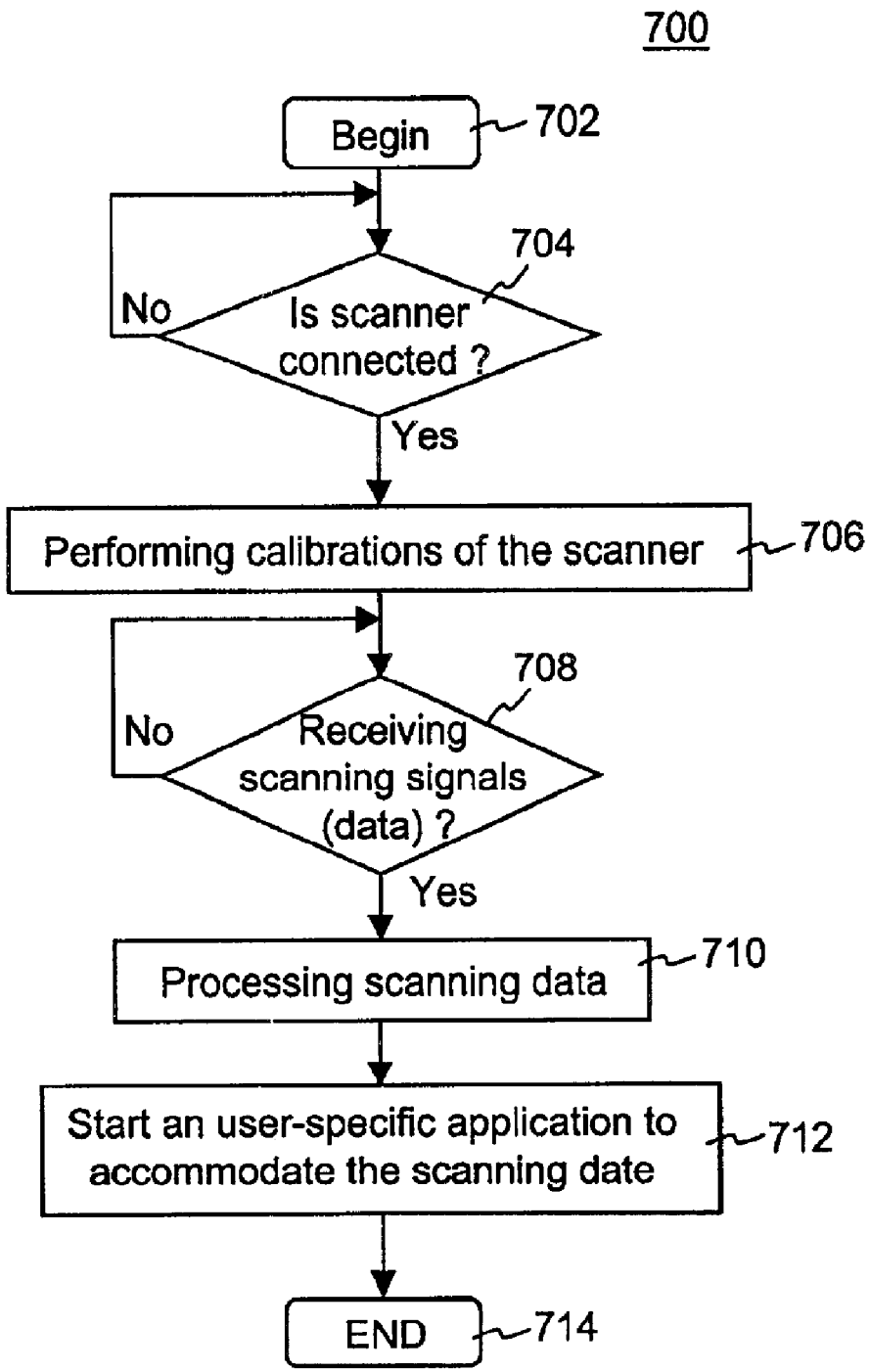
FIG. 7 shows a process flowchart that may be implemented in a computing device to be coupled or integrated with a scanner herein.

FIG. 7 shows a process flowchart 700 that can be used to implement an application or a software agent executed in a computing device to energize and/or synchronize the operations of a scanner being coupled to the computing device. Depending on an exact implementation, process 700 can be launched manually or automatically. At 704, process 700 fist checks to determine if the scanner is being connected to the computing device. Since the scanner depends on the power provided by the computing device, when being connected, the scanner can be configured to produce a signal (e.g. a handshaking signal) so that the computing device can proceed forward. At 706, various calibrations are performed to the scanner. An exemplary detailed explanation of the calibrations can be found in Ser. No. 09/154,395, now U.S. Pat. No. 6,275,309. At 708, the computing device is awaiting scanning signals or data from the scanner. At this time, the scanner remains powered by a connection means from the computing device. When a user inserts a scanning sheet into the scanner, the image sensing module starts producing scanning signals. After the scanning signals (data) are processed and ready for transmission to the computing device, the computing device receives the scanning data over the connection means. At 710, the received scanning data is processed with respect to the calibration of the scanner. At 712, a user-specific application is activated to accommodate the received data. The user-specific application may include, but not be limited to, a display on a screen of the computing device, an optical character recognition, a transmission to an device over the Internet or a wireless network.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the coupling means between a pocket scanner and a computing device can be any types that draws power from the computing device to energize pocket scanner and transport scanning signals or data back to the computing device. These connection types may include, but not be limited to, a multi-pin serial connection (e.g. RS 232 or USB) or a parallel connection. Also it is clear that some of the functions in the electronic circuit may be performed in a computing device to which the pocket scanner is coupled. In addition, a pocket scanner or a portable scanner may be battery powered and the scanning signals generated therein can be transported to a computing device through a wired-line means (e.g. a USB or RS232 cable) or a wireless means (Infrared, and various radio schemes). While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A scanner comprising:

a case housing an image sensing module, a motion mechanism and electronics circuit, all electronically coupled to a connection mechanism, the case including a passage having a receiving end and an exit end, the image sensing module, the motion mechanism and the electronics circuit operating only when the connection mechanism is electronically and removably connected to a computing device, wherein the scanner is calibrated in accordance with the computing device, and when a scanning object is received in the receiving end, the motion mechanism advancing the scanning object towards the exit end and, at the same time, the image sensing module extending to cover an entire scanning width of the scanning object, sensing the scanning object and generating scanning signals thereof and the electronics circuit processing the scanning signals and transporting the processed scanning signals to the computing device through the connection mechanism.

2. The scanner of claim 1, wherein the connection mechanism draws power from the computing device to energize the Image sensing module, the motion mechanism and the electronics circuit to operate.

3. The scanner of claim 2, wherein the computing device is selected from a group consisting of a palm-sized computer, a mobile computing device, a laptop computer and a desktop computer.

4. The scanner of claim 2, wherein the image sensing module includes a first illumination source to illuminate the scanning object for scanning by an image sensor in the image sensing module when the scanning object passes by.

5. The scanner of claim 4, wherein the scanning object is opaque.

6. The scanner of claim 5, wherein the image sensing module includes a second illumination source to illuminate the scanning object for scanning by an image sensor in the image sensing module when the scanning object passes by.

7. The scanner of claim 6, wherein the scanning object is transparent.

8. The scanner of claim 7, wherein one of the first illumination source and the second illumination source is turned on when the scanning object is received.

9. The scanner of claim 2, wherein the electronic circuit generates one or more control signals to synchronize operations of the image sensing module and the motion mechanism.

10. The scanner of claim 2, wherein the electronic circuit receives one or more control signals from the computing device to synchronize operations of the image sensing module and the motion mechanism.

11. The scanner of claim 10, wherein the connection mechanism draws power from the computing device to energize the image sensing module, the motion mechanism and the electronics circuit to operate like a single device.

12. The scanner of claim 1 being configured in such a way that the scanner can be removably integrated with a computing device.

13. The scanner of claim 1, wherein the connection mechanism is a type of cable connection that has at least 2 pins to draw power from the computing device to energize to energize the image sensing module, the motion mechanism and the electronics circuit to operate.

14. A method for using a scanner, the method comprising:
providing the scanner that comprises an image sensing module, a motion mechanism and an electronics circuit that support operations of the image sensing module and the motion mechanism, wherein the scanner can not function without being connected to a computing device;
causing the scanner to be removably connected to the computing device by an electronic connection means that in turn draws power from the computing device to energize the image sensing module, the motion mechanism and the electronics circuit to operate, wherein the image sensing module includes an image sensor, a lens and an illumination source, all extending to cover an entire scanning width of a scanning sheet, and
wherein scanning signals are generated and transported back to the computing device when the scanning sheet is inserted into the scanner.

15. The method of claim 14, wherein the scanner further includes a passage having a receiving end and an exit end, the receiving end receiving the scanning sheet that is advanced by the motion mechanism towards to the exit end, during which the image sensing module generates the scanning signals from the scanning sheet.

16. A method for using a scanner, the method comprising:
providing the scanner that comprises an image sensing module, a motion mechanism and an electronics circuit that support operations of the image sensing module and the motion mechanism, wherein the scanner can not function without being connected to a computing device, and the scanner is calibrated in accordance with the computing device as soon as the electronics circuit is connected to the computing device;
causing the scanner to be removably integrated with the computing device so that both the scanner and the computing device look like a single device, as such the computing device is equipped with a scanning capability; and wherein, when a scanning sheet is inserted into the scanner, scanning signals are generated by the image sensing module including an image sensor, a lens and an illumination source, all extending to cover an entire scanning width of the scanning sheet, and the scanning signals are transported to the computing device.

17. The method of claim 16, wherein the scanner is energized by power supplied by the computing device.

18. The method of claim 17, wherein the scanner and the computing device are electrically connected.

* * * * *